(12) United States Patent
Xiang

(10) Patent No.: US 11,061,281 B2
(45) Date of Patent: Jul. 13, 2021

(54) BACKLIGHT MODULE AND DISPLAY DEVICE

(71) Applicant: TCL CHINA STAR OPTOELECTRONICS TECHNOLOGY CO., LTD., Guangdong (CN)

(72) Inventor: Changming Xiang, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 29 days.

(21) Appl. No.: 16/618,800

(22) PCT Filed: Nov. 13, 2019

(86) PCT No.: PCT/CN2019/117819
§ 371 (c)(1),
(2) Date: Dec. 3, 2019

(87) PCT Pub. No.: WO2021/031404
PCT Pub. Date: Feb. 25, 2021

(65) Prior Publication Data
US 2021/0055609 A1 Feb. 25, 2021

(30) Foreign Application Priority Data
Aug. 20, 2019 (CN) .......................... 201910766887.8

(51) Int. Cl.
*G02F 1/13357* (2006.01)
(52) U.S. Cl.
CPC .............................. *G02F 1/133615* (2013.01)

(58) Field of Classification Search
CPC ................................................ G02F 1/133615
USPC ........................................................ 362/97.3
See application file for complete search history.

(56) References Cited

U.S. PATENT DOCUMENTS

| 5,211,463 | A | * | 5/1993 | Kalmanash | .......... | G02B 6/0051 |
| | | | | | | 362/23.15 |
| 5,303,322 | A | * | 4/1994 | Winston | ............... | G02B 6/0046 |
| | | | | | | 385/146 |
| 5,550,657 | A | * | 8/1996 | Tanaka | ................. | G02B 6/0055 |
| | | | | | | 349/62 |
| 10,634,948 | B2 | * | 4/2020 | Takase | ............. | G02F 1/133615 |
| 10,908,459 | B2 | * | 2/2021 | Miyata | ................. | G02B 6/0088 |
| 2006/0279945 | A1 | * | 12/2006 | Hasei | ............... | G02F 1/133606 |
| | | | | | | 362/97.3 |
| 2007/0086208 | A1 | * | 4/2007 | Lee | ...................... | G02B 6/0011 |
| | | | | | | 362/613 |

(Continued)

FOREIGN PATENT DOCUMENTS

| CN | 101004507 A | 7/2007 |
| CN | 101881402 A | 11/2010 |
| CN | 103697376 A | 4/2014 |

*Primary Examiner* — Bryon T Gyllstrom
(74) *Attorney, Agent, or Firm* — Mark M. Friedman

(57) ABSTRACT

The backlight module provided by the present invention utilizes a reflection plate and a Fresnel lens disposed between the light-emitting diode (LED) light source and the reflection plate to form a side-lit LED backlight without a light guide plate, which can simplify optical structure of the backlight. From a point of view, heavy weight and high cost problems of the light guide plate is solved while improving illumination efficiency.

18 Claims, 3 Drawing Sheets

(56) References Cited

U.S. PATENT DOCUMENTS

| | | | |
|---|---|---|---|
| 2007/0171676 A1* | 7/2007 | Chang | G02B 6/0046 362/613 |
| 2009/0109706 A1* | 4/2009 | Hsu | G02B 6/0066 362/97.3 |
| 2015/0253622 A1* | 9/2015 | Li | G02F 1/133603 362/97.3 |
| 2017/0248823 A1 | 8/2017 | Dunn et al. | |

* cited by examiner

BACKLIGHT MODULE AND DISPLAY DEVICE

FIELD OF INVENTION

The present invention relates to the field of display technologies, and more particularly to a backlight module and a display device for a side-lit LED backlight.

BACKGROUND OF INVENTION

Main components of liquid crystal displays include a liquid crystal display panel composed of a color filter, thin film transistors, and liquid crystal molecules, and a backlight module providing a light source. Present backlight modules mostly use light-emitting diodes (LEDs) as a backlight for better display colors. Traditional LED backlights are divided into a direct-lit LED backlight and a side-lit LED backlight according to position of a light source. The side-lit backlight uses a light guide plate to convert the side-lit LED linear light source on a side of the backlight module into a planar output light of the backlight module. The backlight module equipped with the side-lit backlight can be very thin compared to the direct-lit backlight, which is advantageous for development of thin liquid crystal displays.

However, introduction of the light guide plate has some problems. For example, due to large amount of heat generated by LEDs during illumination process, the temperature in a narrow cavity of the side-lit backlight may cause temperature to be too high, causing problem of warpage of light guide plate, thereby causing illumination efficiency greatly reduced. Moreover, as material of the light guide plate ages, it will cause extinction to a specific light-emitting wavelength, which directly affects display colors. On the other hand, production cost is increased due to the complicated optical structure of the light guide plate.

Therefore, how to solve problem that thermal warpage of the light guide plate and avoid influence of heat generated by LED illumination process on optical performance, thereby improving utilization rate of light energy, is an urgent problem to be solved.

Technical Problem

Due to large amount of heat generated by LEDs during illumination process, the temperature in a narrow cavity of the side-lit backlight may cause temperature to be too high, causing problem of warpage of light guide plate, thereby causing illumination efficiency greatly reduced. Moreover, as material of the light guide plate ages, it will cause extinction to a specific light-emitting wavelength, which directly affects display colors.

SUMMARY OF INVENTION

Technical Solution

In order to solve the above problems in the prior art, an object of the present invention is to provide a backlight module, the backlight module including: a light-emitting diode (LED) light source disposed on at least one side of the backlight module; a backlight frame configured to accommodate the LED light source; a reflection plate configured to reflect light of the LED light source to provide a planar output light; at least one Fresnel lens disposed between the LED light source and the reflection plate; and a light board disposed above a light-emitting surface of the backlight module to make an output light of the backlight module uniform.

In an embodiment of the invention, the backlight frame further includes a backplate, a reflective portion disposed on at least one side of the backlight module and connected to the backplate, at least one clamping groove arranged along a side of the backlight module and perpendicular to the backplate for receiving the at least one Fresnel lens, and side plates disposed on opposite sides of the backlight module and connected to the backplate and the reflective portion to form an enclosed space and the light-emitting surface of the backlight module.

In an embodiment of the invention, the LED light source further includes a plurality of LEDs and a bottom plate, the bottom plate is perpendicular to the backplate, the LED light source faces the reflective portion, and the reflective portion is configured to reflect light emitted by the plurality of LEDs into the Fresnel lens.

In an embodiment of the invention, the reflective portion is a V-shaped reflective surface, and a V-shaped bottom portion of the V-shaped reflective surface faces the LED light source and is parallel to a center line of the bottom plate.

In an embodiment of the invention, the backplate, the reflective portion and the at least one clamping groove of the backlight frame are integrally formed, the reflective portion and the at least one clamping groove are formed on both sides of the backplate by bending.

In an embodiment of the invention, material of the backlight frame includes aluminum, silver, gold, copper, a metal material having a reflectance greater than 0.25, or plastic.

In an embodiment of the invention, each of the side plates further includes an engagement mechanism configured to support the bottom plate.

In an embodiment of the invention, the reflection plate has two inclined planes and is glued and mounted to the backlight frame.

In an embodiment of the invention, the light board is a diffusion light board having a microlens structure.

In order to achieve the above object, the present invention further provides a display device. The display device including: a backlight module, a display panel, and a driving module electrically connected to the backlight module and the display panel to control an image of the display panel, wherein the backlight module includes:

a light-emitting diode light source disposed on at least one side of the backlight module; a backlight frame configured to accommodate the LED light source;

a reflection plate configured to reflect light of the LED light source to provide a planar output light; at least one Fresnel lens disposed between the LED light source and the reflection plate; and a light board disposed above a light-emitting surface of the backlight module to make the output light of the backlight module uniform.

In an embodiment of the invention, the backlight frame further includes a backplate, a reflective portion disposed on at least one side of the backlight module and connected to the backplate, at least one clamping groove arranged along a side of the backlight module and perpendicular to the backplate for receiving the at least one Fresnel lens, and side plates disposed on opposite sides of the backlight module and connected to the backplate and the reflective portion to form an enclosed space and the light-emitting surface of the backlight module.

In an embodiment of the invention, the LED light source further includes a plurality of LEDs and a bottom plate, the bottom plate is perpendicular to the backplate, the LED light source faces the reflective portion, and the reflective portion is configured to reflect light emitted by the plurality of LEDs into the Fresnel lens.

In an embodiment of the invention, the reflective portion is a V-shaped reflective surface, and a V-shaped bottom portion of the V-shaped reflective surface faces the LED light source and is parallel to a center line of the bottom plate.

In an embodiment of the invention, the backplate, the reflective portion and the at least one clamping groove of the backlight frame are integrally formed, the reflective portion and the at least one clamping groove are formed on both sides of the backplate by bending.

In an embodiment of the invention, material of the backlight frame includes aluminum, silver, gold, copper, a metal material having a reflectance greater than 0.25, or plastic.

In an embodiment of the invention, each of the side plates further includes an engagement mechanism configured to support the bottom plate.

In an embodiment of the invention, the reflection plate has two inclined planes and is glued and mounted to the backlight frame.

In an embodiment of the invention, the light board is a diffusion light board having a microlens structure.

In order to achieve the above object, the present invention further provides a backlight module, including: a light-emitting diode light source disposed on at least one side of the backlight module; a backlight frame configured to accommodate the LED light source; a reflection plate configured to reflect light of the LED light source to provide a planar output light; at least one Fresnel lens disposed between the LED light source and the reflection plate; and a light board disposed above a light-emitting surface of the backlight module to make the output light of the backlight module uniform, wherein the reflection plate has two inclined planes and is glued and mounted to the backlight frame, and the light board is a diffusion light board having a microlens structure.

In an embodiment of the invention, the backlight frame further includes a backplate, a reflective portion disposed on at least one side of the backlight module and connected to the backplate, at least one clamping groove arranged along a side of the backlight module and perpendicular to the backplate for receiving the at least one Fresnel lens, and side plates disposed on opposite sides of the backlight module and connected to the backplate and the reflective portion to form an enclosed space and the light-emitting surface of the backlight module, wherein the LED light source further includes a plurality of LEDs and a bottom plate, the bottom plate is perpendicular to the backplate, the LED light source faces the reflective portion, and the reflective portion is configured to reflect light emitted by the plurality of LEDs into the Fresnel lens.

The backlight module provided by the present invention utilizes the reflection plate and the Fresnel lens disposed between the LED light source and the reflection plate to form a side-lit LED backlight without a light guide plate, which can simplify optical structure of the backlight. From point of view, problem of large weight and high cost of the light guide plate is solved while improving illumination efficiency. Moreover, influence of thermal warpage of light guide plate on optical performance is further avoided and utilization rate of light energy is improved.

Beneficial Effect

Compared with the conventional art, the backlight module provided by the present invention utilizes the reflection plate and the Fresnel lens disposed between the LED light source and the reflection plate to form a side-lit LED backlight without a light guide plate, which can simplify optical structure of the backlight.

BRIEF DESCRIPTION OF FIGURES

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION OF EMBODIMENTS

Figure 1:
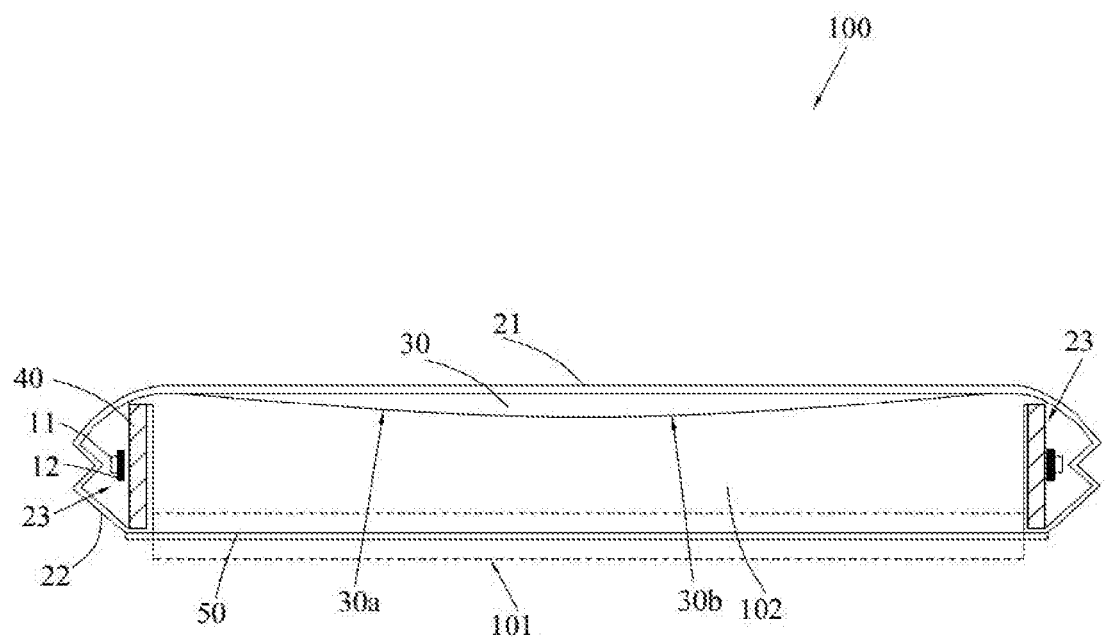
FIG. 1 is a schematic structural diagram of a backlight module according to an embodiment of the present invention.

The following description of each embodiment, with reference to the accompanying drawings, is used to exemplify specific embodiments which may be carried out in the present invention. Directional terms mentioned in the present invention, such as "top", "bottom", "front", "back", "left", "right", "inside", "outside", "side", etc., are only used with reference to the orientation of the accompanying drawings. Therefore, the used directional terms are intended to illustrate, but not to limit, the present invention. In the drawings, components having similar structures are denoted by the same numerals.

In addition, in order to avoid obscuring the invention in unnecessary detail, only the structures and/or process steps that are closely related to the aspects of the present invention are shown in the drawings.

Please refer to FIG. 1, which is a schematic structural diagram of a backlight module according to an embodiment of the present invention. The backlight module 100 includes a light-emitting diode (LED) light source 10 disposed on at least one side of the backlight module 100; a backlight frame 20 is configured to accommodate the LED light source 10; a reflection plate 30 is configured to reflect light of the LED light source 10 to provide a planar output light; at least one Fresnel lens 40 is disposed between the LED light source 10 and the reflection plate 30; and a light board 50 is disposed above a light-emitting surface 101 of the backlight module to make an output light of the backlight module uniform.

The backlight module 100 provided by the present invention utilizes the reflection plate 30 and the Fresnel lens 40 disposed between the LED light source 10 and the reflection plate 30, eliminating the light guide plate in the conventional backlight module, which simplifies optical structure of the backlight module. The details are as follows.

Figure 2:
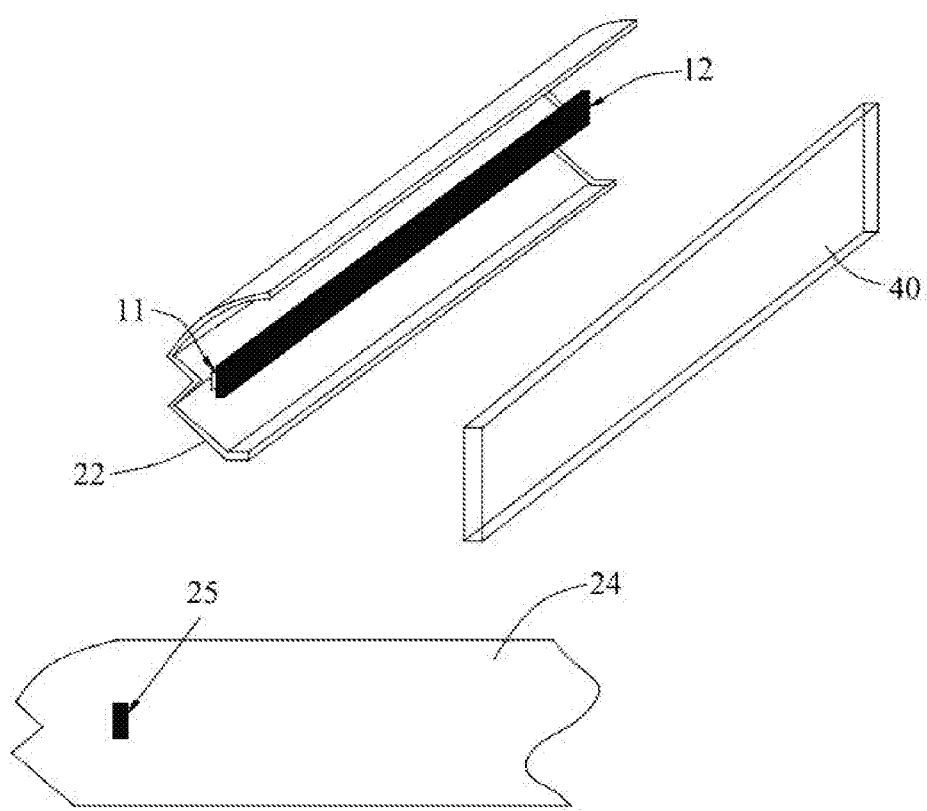
FIG. 2 is a schematic exploded diagram of part of the backlight module of FIG. 1.

Please refer to FIG. 1 and FIG. 2 simultaneously. FIG. 2 is a partial exploded diagram of the backlight module 100 of FIG. 1. Meanwhile, the LED light source 10 includes a plurality of LEDs 11 and a bottom plate 12. The backlight frame 20 further includes a backplate 21, a reflective portion 22 disposed at least one side of the backlight module 100 and connected to the backplate 21, at least one clamping groove 23 arranged along a side of the backlight module and perpendicular to the backplate 21 for receiving the at least one Fresnel lens 40, and side plates 24 disposed on opposite sides of the backlight module 100 and connected to the backplate 21 and the reflective portion 22 to form an enclosed space 102 and the light-emitting surface 101 of the backlight module 100. The light board 50 is disposed on a position corresponding to the light-emitting surface 101, opposing to the backplate 21.

The bottom plate 12 of the LED light source 10 is perpendicular to the backplate 21, and the LED light source 10 faces the reflective portion 22. The reflective portion 22 reflects the light emitted from the plurality of LEDs 11 almost all into the Fresnel lens 40. The Fresnel lens 40 has a plurality of concentric circular paths that have effect of a convex lens, which maintain uniform brightness after being concentrated and projected to form uniform light. After light passes through the Fresnel lens 40, a portion of light is transmitted to the reflection plate 30 and reflected to the light board 50, and a portion of light is directly incident on the light board 50. Since light emitted from the LEDs 11 is reflected at the reflective portion 22, light loss caused by additional structure is reduced. Furthermore, since the LED light source 10 is positioned correspond to the Fresnel lens 40, light emitted from the LED light source passes through an upper half of the Fresnel lens 40 where closed to the reflection plate 30 is reflected by the reflection plate 30 and in form of non-grazing light, which greatly avoids the Fresnel reflection problem caused by the grazing. In contrast, part of light passes through a lower half of the Fresnel lens 40 where closed to the light board 50 is grazing light. However, after all the light passes through the light board 50 which has a diffusing light effect, the Fresnel loss is reduced, illumination efficiency is improved, and illumination is more uniform.

In other embodiments, the reflective portion 22 can be bent into a V-shaped to form a V-shaped reflective surface, and a V-shaped bottom portion of the V-shaped reflective surface faces the LED light source 10 and is parallel to a center line of the bottom plate 12, which increases total amount of light emitting from the LED light source 10 reflected into the Fresnel lens 40. Light-emitting surfaces of the LEDs 11 face a triangular-shaped reflective surface as the V-shaped reflective surface, and the triangular-shaped reflective surface reflects almost all the light emitted from the LEDs 11. The reflected light partially propagates upward, passes through the Fresnel lens 40 to reach the inclined planes 30a, 30b of the reflection plate 30, and then reflects to the light board 50. The other portion is propagated downward through the Fresnel lens 40 and is directed to the light board 50.

In other embodiments, the backlight frame 20 can be the backplate 21, the reflective portion 22, and the clamping groove 23 are integrally formed, that is, the reflective portion 22 and the clamping groove 23 are formed by mechanical bending on both sides of the backplate 21, and then together with the side plates 24, constitutes a support structure of the backlight module 100 and houses related components of the backlight module 100. The backlight frame 20 is made of a metal material having high reflectivity, such as aluminum, silver, gold, copper, or the like, or a metal material having a reflectance greater than 0.25, or high-strength plastic.

The side plates 24 are mainly used for fixing the light source, and an engagement mechanism 25 is disposed on each of side plates 24 and configured to support the bottom plate 12 of the LED light source 10. The engagement mechanism 25 can be an opening having the same size as cross-section of end of the bottom plate 12 or a hook structure that cooperates with the bottom plate 12. A material of the side plate 24 is, for example, metal or high-strength plastic.

The reflection plate 30 has double inclined planes 30a, 30b, and is mounted on the integrally formed backlight frame 20 by glue attached or mechanism design, wherein the double inclined planes 30a, 30b can be further processed, so that the reflection plate 30 becomes a diffuse reflective backplate having high reflectivity. A material of the reflection plate 30 is, for example, plastic.

The light board 50 is a diffusion light board having a microlens structure on both surfaces, and is made of polymethyl methacrylate (PMMA), which is formed by integral processing, and the microlens structure can be formed by laser processing.

The Fresnel lens 40 is made of PMMA and can be processed by integral injection molding.

Figure 3:
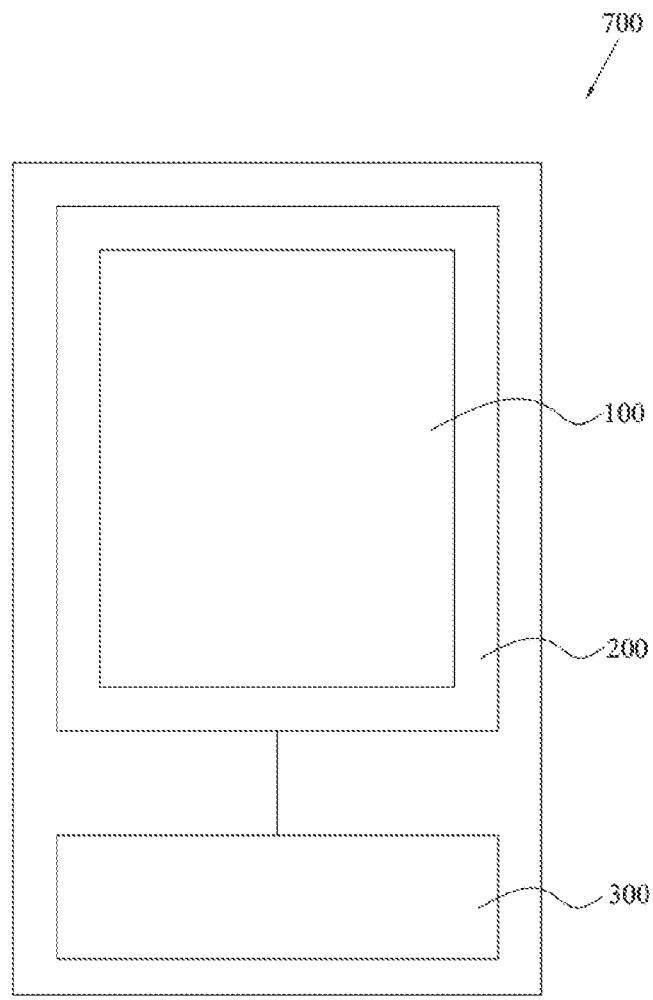
FIG. 3 is a schematic diagram of a display device according to an embodiment of the present invention.

Please refer to FIG. 3, FIG. 3 is a schematic diagram of a display device according to an embodiment of the present invention. The display device 700 includes one of the above-mentioned backlight module 100, a display panel 200, and a driving module 300 electrically connected to the backlight module 100 and the display panel 200 to control image screens of the display panel 200.

Embodiments of the present invention have been described, but not intending to impose any unduly constraint to the appended claims. For a person skilled in the art, any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A backlight module, comprising:
   a light-emitting diode (LED) light source disposed on at least one side of the backlight module;
   a backlight frame configured to accommodate the LED light source;
   a reflection plate configured to reflect light of the LED light source to provide a planar output light;
   at least one Fresnel lens disposed between the LED light source and the reflection plate; and
   a light board disposed above a light-emitting surface of the backlight module to make an output light of the backlight module uniform;
   wherein the backlight frame comprises a backplate, a reflective portion disposed on at least one side of the backlight module and connected to the backplate, at least one clamping groove arranged along a side of the backlight module and perpendicular to the backplate for receiving the at least one Fresnel lens, and side plates disposed on opposite sides of the backlight module and connected to the backplate and the reflective portion to form an enclosed space and the light-emitting surface of the backlight module.

2. The backlight module of claim 1, wherein the LED light source comprises a plurality of LEDs and a bottom plate, the bottom plate is perpendicular to the backplate, the LED light source faces the reflective portion, and the reflective portion is configured to reflect light emitted by the plurality of LEDs into the Fresnel lens.

3. The backlight module of claim 2, wherein the reflective portion is a V-shaped reflective surface, and a V-shaped bottom portion of the V-shaped reflective surface faces the LED light source and is parallel to a center line of the bottom plate.

4. The backlight module of claim 2, wherein each of the side plates comprises an engagement mechanism configured to support the bottom plate.

5. The backlight module of claim 1, wherein the backplate, the reflective portion and the at least one clamping groove of the backlight frame are integrally formed, the reflective portion and the at least one clamping groove are formed on both sides of the backplate by bending.

6. The backlight module of claim 5, wherein material of the backlight frame comprises aluminum, silver, gold, copper, a metal material having a reflectance greater than 0.25, or plastic.

7. The backlight module of claim 1, wherein the reflection plate has two inclined planes and is glued and mounted to the backlight frame.

8. The backlight module of claim 1, wherein the light board is a diffusion light board having a microlens structure.

9. A display device, comprising:
- a backlight module, a display panel, and a driving module electrically connected to the backlight module and the display panel to control an image of the display panel, wherein the backlight module comprises:
- a light-emitting diode (LED) light source disposed on at least one side of the backlight module;
- a backlight frame configured to accommodate the LED light source;
- a reflection plate configured to reflect light of the LED light source to provide a planar output light;
- at least one Fresnel lens disposed between the LED light source and the reflection plate; and
- a light board disposed above a light-emitting surface of the backlight module to make an output light of the backlight module uniform;
- wherein the backlight frame comprises a backplate, a reflective portion disposed on at least one side of the backlight module and connected to the backplate, at least one clamping groove arranged along a side of the backlight module and perpendicular to the backplate for receiving the at least one Fresnel lens, and side plates disposed on opposite sides of the backlight module and connected to the backplate and the reflective portion to form an enclosed space and the light-emitting surface of the backlight module.

10. The display device of claim 9, wherein the LED light source comprises a plurality of LEDs and a bottom plate, the bottom plate is perpendicular to the backplate, the LED light source faces the reflective portion, and the reflective portion is configured to reflect light emitted by the plurality of LEDs into the Fresnel lens.

11. The display device of claim 10, wherein the reflective portion is a V-shaped reflective surface, and a V-shaped bottom portion of the V-shaped reflective surface faces the LED light source and is parallel to a center line of the bottom plate.

12. The display device of claim 10, wherein each of the side plates comprises an engagement mechanism configured to support the bottom plate.

13. The display device of claim 9, wherein the backplate, the reflective portion and the at least one clamping groove of the backlight frame are integrally formed, the reflective portion and the at least one clamping groove are formed on both sides of the backplate by bending.

14. The display device of claim 13, wherein material of the backlight frame comprises aluminum, silver, gold, copper, a metal material having a reflectance greater than 0.25, or plastic.

15. The display device of claim 9, wherein the reflection plate has two inclined planes and is glued and mounted to the backlight frame.

16. The display device of claim 9, wherein the light board is a diffusion light board having a microlens structure.

17. A backlight module, comprising:
- a light-emitting diode (LED) light source disposed on at least one side of the backlight module;
- a backlight frame configured to accommodate the LED light source;
- a reflection plate configured to reflect light of the LED light source to provide a planar output light;
- at least one Fresnel lens disposed between the LED light source and the reflection plate; and
- a light board disposed above a light-emitting surface of the backlight module to make an output light of the backlight module uniform,
- wherein the reflection plate has two inclined planes and is glued and mounted to the backlight frame, and the light board is a diffusion light board having a microlens structure; and
- the backlight frame comprises a backplate, a reflective portion disposed on at least one side of the backlight module and connected to the backplate, at least one clamping groove arranged along a side of the backlight module and perpendicular to the backplate for receiving the at least one Fresnel lens, and side plates disposed on opposite sides of the backlight module and connected to the backplate and the reflective portion to form an enclosed space and the light-emitting surface of the backlight module.

18. The backlight module of claim 17, wherein the LED light source comprises a plurality of LEDs and a bottom plate, the bottom plate is perpendicular to the backplate, the LED light source faces the reflective portion, and the reflective portion is configured to reflect light emitted by the plurality of LEDs into the Fresnel lens.

* * * * *